(12) United States Patent
Stevens et al.

(10) Patent No.: US 12,101,159 B2
(45) Date of Patent: Sep. 24, 2024

(54) SYSTEM AND APPARATUS FOR GEOSPATIAL COGNITIVE NETWORKING

(71) Applicant: The Johns Hopkins University, Baltimore, MD (US)

(72) Inventors: Brian W. Stevens, Elkridge, MD (US); Mohamed Younis, Baltimore, MD (US)

(73) Assignee: The John Hopkins University, Baltimore, MD (US)

( * ) Notice: Subject to any disclaimer, the term of this patent is extended or adjusted under 35 U.S.C. 154(b) by 62 days.

(21) Appl. No.: 18/125,806

(22) Filed: Mar. 24, 2023

(65) Prior Publication Data
US 2023/0308159 A1    Sep. 28, 2023

Related U.S. Application Data

(60) Provisional application No. 63/323,121, filed on Mar. 24, 2022.

(51) Int. Cl.
*H04B 7/06*    (2006.01)

(52) U.S. Cl.
CPC ....... *H04B 7/06958* (2023.05); *H04B 7/0639* (2013.01)

(58) Field of Classification Search
CPC .......................... H04B 7/06958; H04B 7/0639
See application file for complete search history.

(56) References Cited

U.S. PATENT DOCUMENTS

| | | | | |
|---|---|---|---|---|
| 11,291,068 B2 * | 3/2022 | Da Silva | ............... | H04W 48/20 |
| 11,949,485 B2 * | 4/2024 | Koskela | ................ | H04B 7/022 |
| 2022/0159566 A1 * | 5/2022 | Liu | ........ | H04W 24/02 |
| 2023/0397084 A1 * | 12/2023 | Shah | ..................... | H04W 40/12 |

OTHER PUBLICATIONS

Stevens, B. W. et al., "Cognitive Resource Analyzer for Cellular Network Ecosystems," IEEE Transactions on Cognitive Communications and Networking, vol. 8, No. 2, Jan. 28, 2022, pp. 733-749.
Kumar, S. et al., "LTE Radio Analytics Made Easy and Accessible," SIGCOMM '14: Proceedings of the 2014 ACM conference on SIGCOMM, Aug. 17, 2014, pp. 211-222.

(Continued)

*Primary Examiner* — Dac V Ha
(74) *Attorney, Agent, or Firm* — Noah J. Hayward

(57) ABSTRACT

A method for providing a self-reliant secondary network of communication nodes using resources associated with a primary network defining sector beams using corresponding resources including respective SSBs includes performing a beam search with respect to the sector beams, performing beam detection to detect neighboring beams among the sector beams, and performing geospatial beam selection to define a selected set of SSBs of respective ones of the sector beams as being geospatial white space unlikely to interfere with the primary network when utilized by the communication nodes in the secondary network. The method may further include performing power control with respect to the selected set of SSBs, and applying medium access control protocols to enable the secondary network to use the selected set of SSBs of the primary network.

20 Claims, 8 Drawing Sheets

(56) References Cited

OTHER PUBLICATIONS

Falkenberg, R. et al., "Client-Based Control Channel Analysis for Connectivity Estimation in LTE Networks," 2016 IEEE 84th Vehicular Technology Conference (VTC—Fall), Montreal, QC, Canada, 2016, pp. 1-6.

Bui, N. et al., "Owl: a Reliable Online Watcher for LTE Control Channel Measurements," ATC '16: Proceedings of the 5th Workshop on All Things Cellular: Operations, Applications and Challenges, Oct. 3, 2016, pp. 25-30.

Falkenberg, R. et al., "Falcon: An Accurate Real-Time Monitor for Client-Based Mobile Network Data Analytics," 2019 IEEE Global Communications Conference (GLOBECOM), Waikoloa, HI, USA, 2019, pp. 1-7.

Wasilewska, M. et al., "Machine Learning for LTE Energy Detection Performance Improvement," Sensors 19(19), 4348, Oct. 8, 2019, pp. 1-19.

Stevens, B. W. et al., "Physical Layer and MAC Design for Self-Reliant Cognitive Multicast Networks Using LTE Resources," IEEE Transactions on Cognitive Communications and Networking, vol. 7, No. 3, Dec. 18, 2020, pp. 818-833.

Karunakaran, P. et al., "A Reference Signal based GLRT for Simultaneous Sensing and Reception in Cognitive LTE—A Systems," 2016 IEEE Wireless Communications and Networking Conference, Doha, Qatar, Apr. 3, 2016, pp. 1-6.

Masood, A. et al., "Surveying pervasive public safety communication technologies in the context of terrorist attacks," Physical Communication, 41, 101109, Apr. 29, 2020, pp. 1-29.

Nasser, A. et al., "Spectrum Sensing for Cognitive Radio: Recent Advances and Future Challenge," Sensors, 21, 2408, Mar. 31, 2021, pp. 1-29.

Stevens, B. W. et al., "Detection Algorithm for Cellular Synchronization Signals in Airborne Applications," IEEE Access, vol. 9, Apr. 7, 2021, pp. 55555-55566.

Raghavan, V. et al., "Millimeter Wave Channel Measurements and Implications for PHY Layer Design," IEEE Transactions on Antennas and Propagation, vol. 65, No. 12, Sep. 29, 2017, pp. 6521-6533.

\* cited by examiner

SYSTEM AND APPARATUS FOR GEOSPATIAL COGNITIVE NETWORKING

CROSS-REFERENCE TO RELATED APPLICATIONS

This application claims priority to and the benefit of prior-filed, U.S. Provisional Application No. 63/323,121, filed Mar. 24, 2022, the content of which is herein incorporated by reference in its entirety.

TECHNICAL FIELD

Example embodiments generally relate to wireless communications and, more particularly, relate to techniques for enabling geospatial cognitive networking protocols and sensing algorithms for 5G NR beamforming.

BACKGROUND

High speed data communications and the devices that enable such communications have become ubiquitous in modern society. The networks and devices that enable these communications have continued to develop and advance, driving improvement in reliability, efficiency, and quality of service all the way along. From so called 3G (third generation) networks, through 4G, LTE and on to 5G (fifth generation) networks, the inexorable movement toward seamless and ever-present network access has continued to drive innovation.

More recently, the adoption of cognitive radios has been implemented to increase spectrum efficiency. However, many existing cognitive radio protocols are generic and do not address the constraints when applied to a specific wireless standard or radio access technology. In theory, every wireless technology can leverage cognitive radio, and of the three cognitive radio paradigms, namely interweave, overlay, and underlay, at least one paradigm should fit with each technology, while the other paradigms may not be applicable at all. As 5G NR (New Radio) continues to experience increased adoption in a cellular network context, leveraging opportunities for 5G cognitive radio has been receiving more and more attention.

The challenges when applying cognitive radio to a specific technology can be complicated depending on a secondary network's reliance on a primary network. Cooperation with the primary network prevents interference at the cost of increased network protocol complexity and additional dependence. A so-called "self-reliant" cognitive network does not cooperate with the primary network with any feedback mechanisms or messages. Of the three paradigms, the interweave paradigm is the most reasonable for a self-reliant network because avoiding interference depends on dynamic spectrum access that only requires knowing network activity and not the contents of dynamically changing network messages. Self-reliant cognitive networks provide communication opportunities without stipulations associated with the primary network, including infrastructure changes, standard adaptations, primary network control channel usage, and reliance on the primary network for all operations. In addition, self-reliant communications can act as robust autonomous backup channels in case of primary network failure. Public safety may be a primary application for these benefits, yet commercial applications also exist.

Recent studies show the importance of cognitive radio in public safety networks in the presence of cyberattacks, when a disaster strikes, and for supplementing the capabilities of existing networks. If networks are vulnerable to outages, backup networks must not rely on those primary networks and should instead conform to self-reliant standards. 5G public safety has focused on low-powered machine type communications (mMTC) using Category-M1 and Narrowband Internet of Things (NB-IoT) and their respective evolution in the 5G NR standard. However, mMTC has a very limited spectrum and requires control signals from the base station for resource coordination. Additionally, 5G NR hopes to leverage Sidelink for both device-to-device (D2D) and vehicle-to-everything (V2X) communication so that devices can communicate without relaying commands through a base-station. However, the Sidelink resource pool limits the spectrum use and relies on the primary network for pre-configuration as well as initialization. Resource pools are a pre-configured subset of resources that are subject to link failures, handover issues, and resource switching challenges. In many proposed adaptations of Sidelink, the phrase "cognitive radio" has been used for overlapping topic areas such as network layer management and adaptable radio architectures. Cognitive radio, as used herein, reflects how secondary networks can coexist in a self-reliant manner with a primary network at the physical (PHY) and medium access control (MAC) layers.

Employing a 5G NR standard compliant, self-reliant cognitive radio may be accomplished with relatively little modification to the MAC layer. However, more significant changes may be needed at the PHY layer. Example embodiments relate to some of these changes that may be provided at the PHY layer including the augmentation of resource detectors to leverage 5G waveforms. In this regard, for example, Cognitive Algorithms for geo-Spatial Interweave Network Operations in 5G New Radio (CASINO-NR) as described herein may effectively repurpose 5G NR synchronization signals as geospatial white space for an interweave paradigm while limiting interference on neighboring beams using the beam detection and avoidance techniques described herein.

BRIEF SUMMARY OF SOME EXAMPLES

Some example embodiments may provide a system in which the creation of a multi-node cluster of collocated secondary nodes is possible with mechanisms to control interference on a per-cluster basis.

In one example embodiment, a method for providing a self-reliant secondary network of communication nodes using resources associated with a primary network defining multiple sector beams using corresponding resources including respective Synchronization Signal Blocks (SSBs) may be provided. The method may include performing a beam search with respect to the sector beams, performing beam detection to detect neighboring beams among the sector beams, and performing geospatial beam selection to define a selected set of SSBs of respective ones of the sector beams as being geospatial white space unlikely to interfere with the primary network when utilized by the nodes in the secondary network. The method may further include performing power control with respect to the selected set of SSBs, and applying medium access control protocols to enable the secondary network to use the selected set of SSBs of the primary network.

In another example embodiment, a radio system may be provided. The radio system may include a primary network base station defining multiple sector beams using corresponding resources including respective SSBs, and a plurality of nodes defining a node cluster in which the nodes of the node cluster each include a control module associated with processing circuitry. The processing circuitry may be configured to perform a beam search with respect to the sector beams, perform beam detection to detect neighboring beams among the sector beams, perform geospatial beam selection to define a selected set of SSBs of respective ones of the sector beams as being in geospatial white space unlikely to interfere with the primary network when utilized by the nodes in the secondary network, perform power control with respect to the selected set of SSBs, and apply medium access control protocols to enable the secondary network to use the selected set of SSBs of the primary network.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
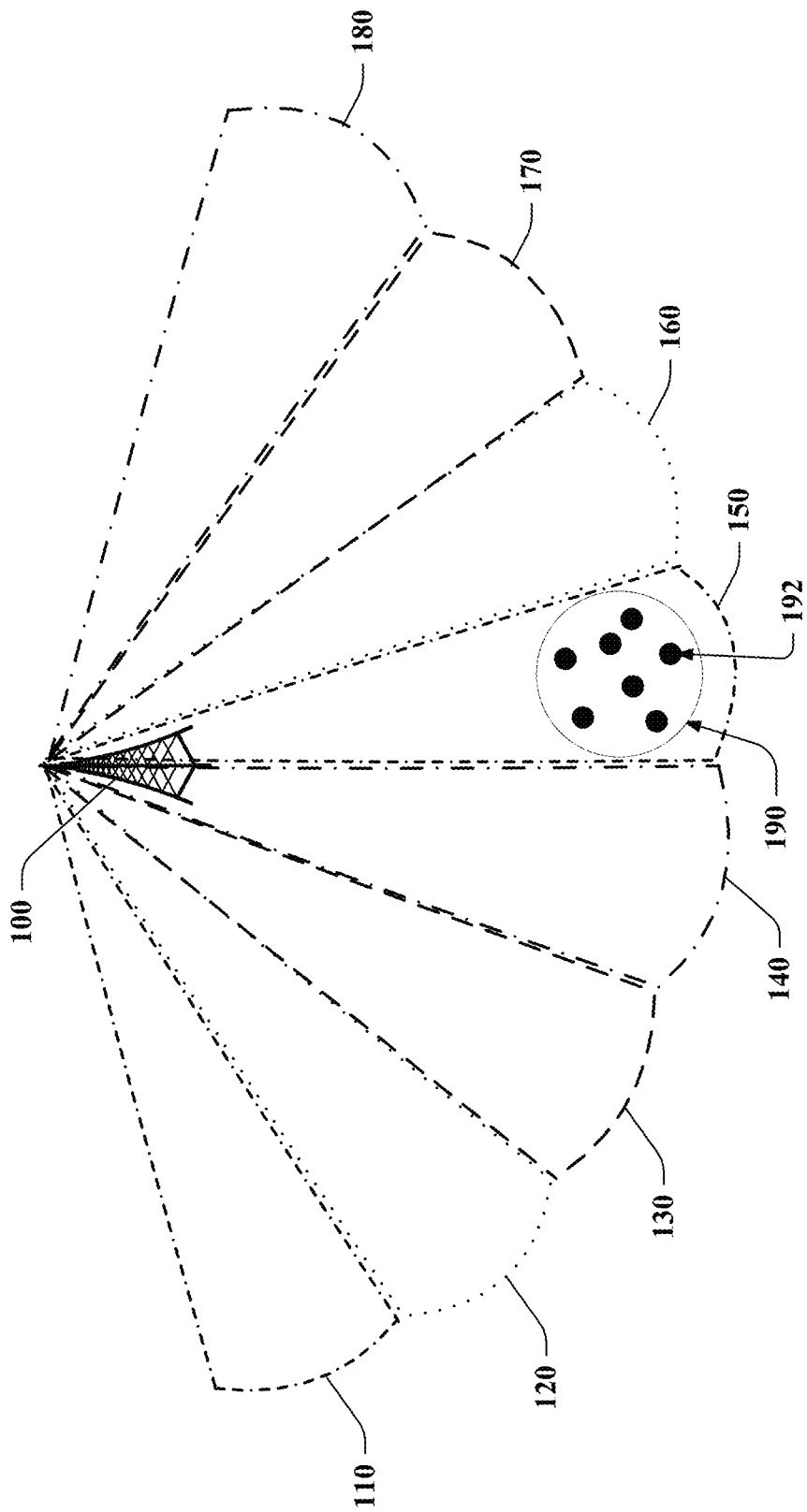
FIG. 1 illustrates a primary network defining beam sectors and a node cluster in one such beam sector to define a self-reliant secondary network in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As used in herein, the term "module" is intended to include a computer-related entity, such as but not limited to hardware, firmware, or a combination of hardware and software (i.e., hardware being configured in a particular way by software being executed thereon). For example, a module may be, but is not limited to being, a process running on a processor, a processor (or processors), an object, an executable, a thread of execution, and/or a computer. By way of example, both an application running on a computing device and/or the computing device can be a module. One or more modules can reside within a process and/or thread of execution and a module may be localized on one computer and/or distributed between two or more computers. In addition, these components can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

Some example embodiments described herein provide a system, architectures and/or methods for improved network communication and performance. In this regard, some example embodiments may provide a protocol for reusing 5G NR synchronization signals of non-neighbor beams that are geographically far away from secondary users. In doing so, avoidance of beams that are close to secondary users may be achieved through beam sensing and ranking. Example embodiments may also provide a power control protocol designed to manage interference between the secondary and primary networks while considering 5G NR beamforming and subcarrier spacing variability. The geospatial reuse and power control protocols may rely on beam avoidance to prevent the use and interference of neighbor beams. Example embodiments may also provide for optimization of beam detection and avoidance by using a combination of various reference signals, including a re-encoded information block concept. In some cases, beam detection and ranking may be improved by comparing various signal and noise plus interference (SINR) measurement techniques via a correlation-based technique that is more sensitive than conventional algorithms. Additionally, some embodiments may optimize beam detection under phase distortions expected in high frequencies of 5G NR. In this regard, example embodiments propose channel equalization as a phase correction method in beam detection and comparison of performance against other mitigation techniques may also be provided.

Self-reliant networks require out-of-network detectors to determine resource availability without collaborating with the primary network. In both 4G and 5G, spectral resources are defined by physical resource blocks (PRBs) with symbols in time and subcarriers in frequency. The smallest spectral resource is a single symbol and subcarrier called a resource element (RE). Resource detection for spectral white space must be updated from 4G to 5G, since LTE and NR differ in a few ways. First, the NR PRB has a minimum duration of a single symbol providing higher flexibility than LTE. Second, instead of finding the control channels at the start of a time slot, the NR control channel can be placed in any PRB location within the channel. Such flexibility makes isolating the NR control channel challenging for any user-specific control channels that do not have open access schedules. Last, while LTE had fixed frequency carriers and defined resource grids, NR has bandwidth parts that dynamically adapt the bandwidth for a user within the frequency carrier.

NR flexibility hinders out-of-network resource detectors where control and data channel settings reside in higher layer messages within radio resource control information that is not accessible outside the network. Without these configurations, energy detectors cannot confirm if 5G resources start at fixed (Type A) or flexible (Type B) times or where white space can start or end in the latter case. Recent work on energy detectors transitioning from 4G to 5G ignores this issue entirely. 4G blind control channel detectors, and designs that leverage them, also struggle to adapt to 5G without such higher layer information. As such, the adaptation of blind control detectors to 5G NR have previously been limited by unknown spectral location and configuration of user-specific control and data channels. Additionally, user-specific control messages in 5G are scrambled with the Radio Network Temporary Identifier (RNTI), which is unique for each user. The unknown scrambling ID and RNTI prevent the 4G blind detector from working on 5G. Avoidance of these issues can be achieved by getting configurations and scrambling IDs from in-network high-layer messages unavailable for out-of-network detectors and self-reliant communications. The aforementioned changes from 4G to 5G increase flexibility and security at the cost of the feasibility of adapting contemporary 4G blind control detectors, which motivates using known resources geospatially as an alternative to traditional white space.

Geospatial use of spectrum may be accomplished, for example, where beamforming increases the potential reuse of the spectrum geographically in cognitive radio environments. However, no cognitive radio research has tried to use 5G NR SSBs in this way. The SSB has a known value and spectral location after synchronization, which can be obtained with out-of-network information. Each SSB has a primary synchronization signal (PSS) and secondary synchronization signal (SSS), which collectively give a cell identity, a master information block (MIB), and the newly added demodulated reference signals (DMRS), as can be seen from FIG. 2.

FIG. 1 illustrates a base station 100 employing 5G NR beamforming defining a primary network. The base station 100 may define a plurality of sectors corresponding to respective different beams and resources used within each. In this regard, a first beam 110, a second beam 120, a third beam 130, a fourth beam 140, a fifth beam 150, a sixth beam 160, a seventh beam 170, and an eighth beam 180. Notably, the coverage (or width) of each of the beams is not important, and thus, the beamwidths demonstrated in FIG. 1 are merely for purposes of illustrating an example. Within each of the beams respective different SSBs or resources are employed for communication via the primary network with nodes within the respective beams.

To define a self-reliant network within the context of the primary network shown in FIG. 1, a node cluster 190 may be defined as a group of individual instances of a node 192 within a given range of each other. The node cluster 190 in this example is located entirely within the fifth beam 150. However, the node cluster 190 may alternatively be within any of the other beams, or even extend over multiple beams in some cases. Regardless, the node cluster 190 may successfully define a secondary network that is self-reliant if, for example, the nodes therein (including node 192 and its neighbors) can utilize resources that are not going to cause interference, or be interfered with. Example embodiments may provide means by which to achieve success in this endeavor.

Figure 2:
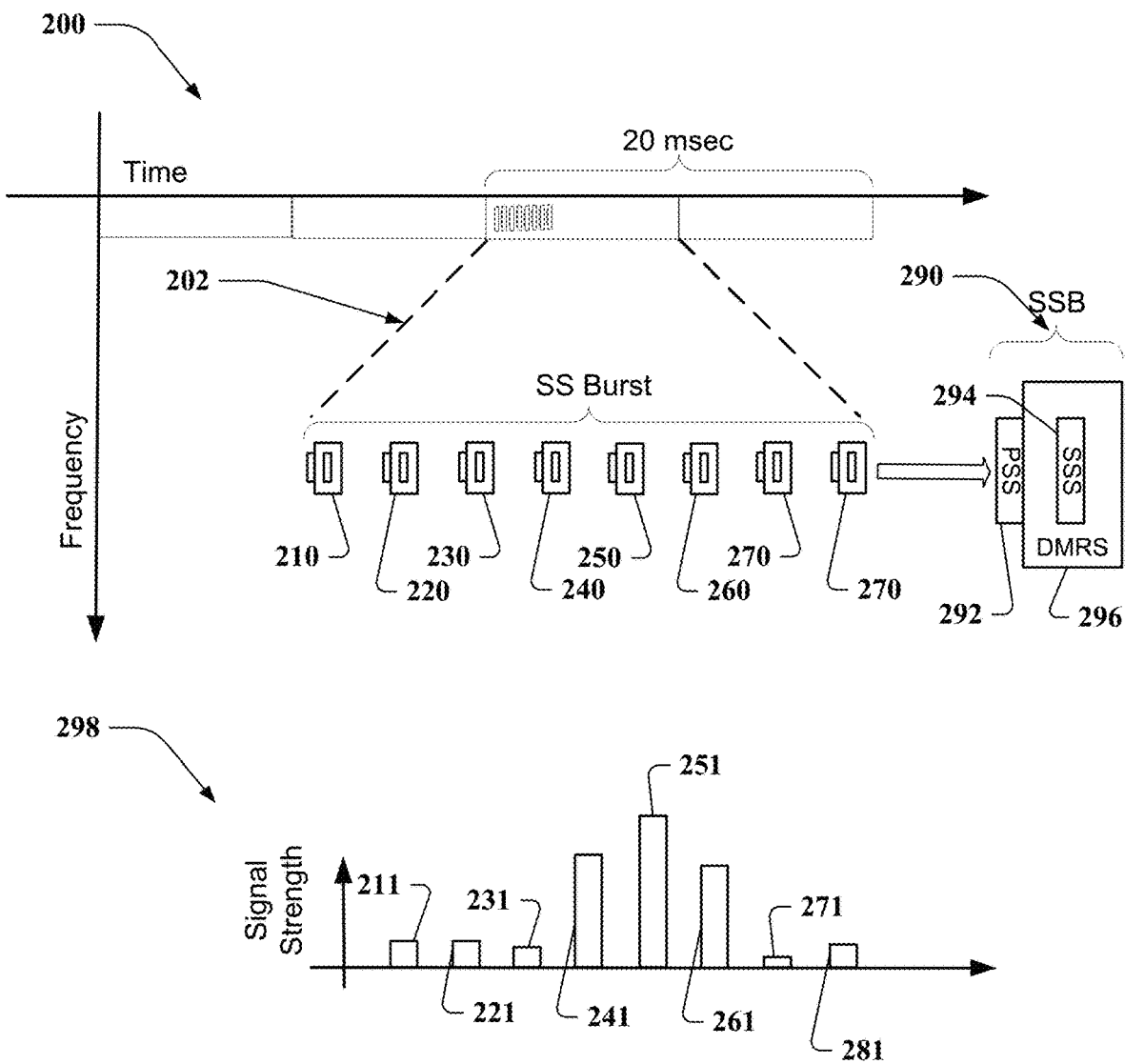
FIG. 2 illustrates plots of frequency versus time and signal strength for respective beams detected in accordance with an example embodiment.

In this regard, for example, FIG. 2 illustrates a plot 200 of frequency versus time along with an expanded view of a synchronization signal burst (SS Burst) 202 of SSBs employed by each respective one of the beams. In this regard, a first SSB 210 may be employed by the first beam 110, a second SSB 220 may be employed by the second beam 120, a third SSB may be employed by the third beam 130, a fourth SSB 240 may be employed by the fourth beam 140, a fifth SSB 250 may be employed by the fifth beam 150, a sixth SSB 260 may be employed by the sixth beam 160, a seventh SSB 270 may be employed by the seventh beam 170, and an eighth SSB 280 may be employed by the eighth beam 180. Each of the first to eighth SSBs is an example of the expanded SSB view 290, and is further defined by or includes a PSS 292, an SSS 294, and DMRS 296.

NR supports beamforming, where coherent signals are concentrated towards a specific azimuth to improve power ratios and throughput, especially important to overcome path loss at mmWave frequencies around 28 GHz and higher. Thus, as seen in FIG. 2, the SSB 290 is sent uniquely for each beam where collectively, the group of SSBs is called the synchronization signal burst (SS Burst). The SSB cannot overlap with other NR waveforms. At synchronization, the beam index (iSSB) is found by users and sent to the base station, which can then direct information to the user for improved performance. From there, additional tightening of the beam pattern may occur using a process called beam refinement. Geospatial white space may occur when some beams are far enough away from a cognitive cluster (e.g., node cluster 190), and their respective SSBs are at the noise floor.

Thus, for example, signal strength measurements by the node 192, located in the fifth beam 150 may therefore be expected to detect a high signal strength for the fifth SSB 250. However, although slightly smaller, large and potentially interfering signal strengths may also be expected to be encountered for the fourth SSB 240 and the sixth SSB 260, since those resources are associated with the fourth beam 140 and the sixth beam 160, which are adjacent to the fifth beam 150. According to example embodiments described herein, the first, second and third SSBs 210, 220 and 230, along with the seventh and eighth SSBs 270 and 280, may therefore be expected to represent geospatial white space that may be advantageously utilized by the node 192 and its neighbors within the node cluster 190 for defining the secondary network.

The means by which to find and employ such geospatial white space will be described in greater detail below. In this regard, plot 298 of FIG. 2 illustrates signal strength measurements that may be made by a node 192 of the node cluster 190 of FIG. 1, to demonstrate how this may be accomplished. First signal strength measurement 211 shows a signal strength for beams of the first SSB 210 as measured by the node 192. Second signal strength measurement 221 shows a signal strength measurement for beams of the second SSB 220 as measured by the node 192. Third signal strength measurement 231 shows a signal strength measurement for beams of the third SSB 230 as measured by the node 192. Fourth signal strength measurement 241 shows a signal strength measurement for beams of the fourth SSB 240 as measured by the node 192. Fifth signal strength measurement 251 shows a signal strength measurement for beams of the fifth SSB 250 as measured by the node 192. Sixth signal strength measurement 261 shows a signal strength measurement for beams of the sixth SSB 260 as measured by the node 192. Seventh signal strength measurement 271 shows a signal strength measurement for beams of the seventh SSB 270 as measured by the node 192. Eighth signal strength measurement 281 shows a signal strength measurement for beams of the eighth SSB 280 as measured by the node 192. As may be expected, since the node cluster 190 is located in the fifth beam 150, the fifth signal strength measurement 251 is highest. The next highest measurements are associated with the fourth and sixth beams 140 and 160. Other beams have even lower measurements and may therefore be better candidates for designation as geospatial white space, and usage in a self-reliant network.

There are tradeoffs between energy, blind control channel, and geospatial SSB reuse. Both energy and blind detectors require high-layer messages in 5G that are not available for out-of-network detection. However, this is not an issue with the geospatial SSB reuse concept, because all SSB locations and their values are known after synchronization. Energy and blind detectors leverage the larger data channel in 5G; however, they do not predictively repeat and have unknown beam orientation, unlike SSBs that typically repeat every 20 ms and are guaranteed to only be given to a single beam. Geospatial SSB reuse also should at least operate down to the traditional cell search sensitivity at around −5 dB over energy and blind detectors, which only operate down to around 7 dB and 10 dB, respectively, leading to better sensitivity and easier interference control. The geospatial SSB concept described herein has overall easier interference management, lower complexity, and is not impacted by dynamically changing traffic at the cost of potential throughput. However, a major concern with the geospatial reuse of beams is how to detect enough neighbor beams to make sure cognitive nodes only use beams that are far away and low risk of interference. This requires highly sensitive beam detection to rank beams for positional awareness and confirm the absence of specific beams in a geographic area. Beam detection becomes more critical when considering that primary users can use multiple neighboring beams for increased diversity, and they too must be avoided.

To enable highly sensitive beam detection and ranking, a parallel concept of upgrading a cell search to a detector can be applied to beam search and detection where thresholds and optimizations are required to detect more than one signal. Cellular waveform measurements include four different metrics for establishing connectivity, namely reference signals received power (RSRP), received signal strength indicator (RSSI), reference signal received quality (RSRQ), and signal to interference and noise ratio (SINR) recently added with the 5G standard. Example embodiments may use any of the four metrics. However, a specific example described herein may employ SINR as it gives a clearer depiction of noise and interference than the other metrics. To estimate SINR, both the signal and the noise plus interference must be estimated. Noise and interference can be estimated with nulls or unused parts of the spectrum. However, because of the flexibility of NR, there are a limited number of resource elements that can be guaranteed to be empty. Instead, a common yet practical approach is using the least-squares (LS) estimate from both channel estimation and practical MMSE equalization. The LS estimate is long-established and, through averaging, can be used to estimate the channel noise. The signal component can also be found using the channel estimation, which is referred to as the L-method. The RSRQ and the load of the network estimate an SINR, which may be called the Q-method, where RSRQ contains both RSRP and RSSI. RSRP may be the signal component of SINR in some cases. However, RSRP does not have a clear definition in the 3GPP standard. Typically, RSRP is a power measurement of the received signal, which may be called the P-method after combining with the LS estimate to find the SINR. RSRP has also been related to correlation instead of a simple power measurement and is applied as the signal component of what is referred to as the C-method.

All methods previously described and the LS estimate use some known reference signal. For example, some common approaches only correlate with the PSS. However, it is possible to consider both PSS and SSS as reference signals in NR synchronization. In the 3GPP 5G NR standard, the DMRS is primarily used, and the SSS is secondarily used for beam measurement called the synchronization signal SINR (SS-SINR). However, CASINO-NR as described herein considers the combinations of multiple references as a longer length and higher gain reference signal and incorporates more than the DMRS and SSS. Such a combination is possible because CASINO-NR assumes synchronization to a primary beam has already occurred. So, the PSS, SSS, and DMRS are all known for any additional beams from the sector. Additionally, example embodiments may look at pre-coding the MIB of the primary beam to increase the correlation gain further for all synchronization beams, which has not previously been proposed. Doing so may, however, require updating some fields such as frame number and re-encoding.

Beamforming typically occurs at higher frequencies, such as in mmWave in 5G NR. At these frequencies, phase noise and errors are common and usually increase. Phase error comes from residual carrier frequency offsets, oscillator phase misalignments, channel variations, multipath, and analog mixing. The estimation of phase noise and error has been considered for cellular signals, where some studies assume coherency. Another approach is to break up the correlation into subsets or parts that are coherent over a spectrum window where the channel frequency response is constant and then incoherently added together. The subset approach uses a common window size of 12 subcarriers and 14 symbols, which has been verified during testing. Other approaches use differential correlation to combine neighboring resource elements to correct phase distortions, called the differential approach. Both the subset and differential approaches have been applied to 4G LTE synchronization signals. Lastly, channel equalization has been used to improve correlation results and may be proposed as the equalization approach. A comparison of the subset, differential, and equalization approaches to determine the best phase correction is described below. These phase mitigation techniques are applied to the signal component of the C-method for SINR estimation and with all combinations of reference signals within the SSB.

CASINO-NR may target the NR SS burst 202 on the downlink for reduced complexity, a more stable resource pool, lower interference potential, and self-reliant cognitive radio development, avoiding the issues with energy and blind traffic monitoring in 5G. Thus, one achievable goal of CASINO-NR may be to find SSBs available for reuse in a geographical area for secondary communications (i.e., to find the geospatial white space).

Figure 3:
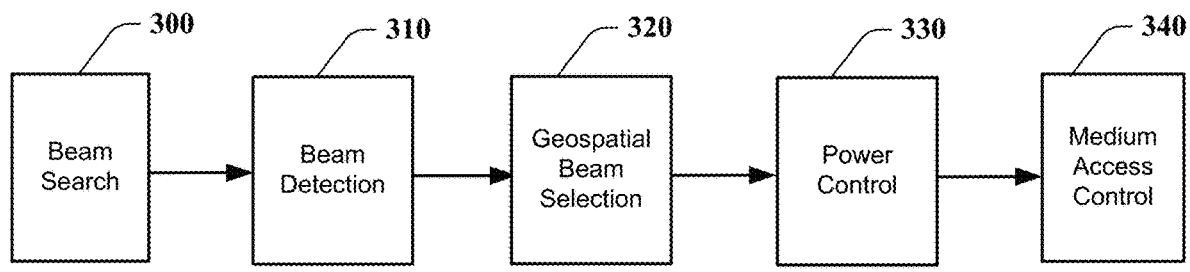
FIG. 3 illustrates a block diagram of general operations performed to establish the secondary network in accordance with an example embodiment.

FIG. 3 illustrates a block diagram of system level operations associated with the execution of a CASINO-NR algorithm in accordance with an example embodiment. Thus, for example, each operation in FIG. 3 may represent a functional block, or deployment example, and timing may increment from left to right through the respective functions or operations. As shown in FIG. 3, the CASINO-NR algorithm may include a beam search at operation 300 for beams of the primary network. The algorithm may further include beam detection at operation 310. The beam detection may aim to detect all neighboring beams that are discernable above a noise threshold in a given area. The algorithm may further include geospatial beam selection at operation 320, which may include ranking of detected beams and applying a threshold thereto, in order to select resources to be used for the secondary network. Finally, the algorithm may include power control with respect to the selected resources at operation 330, and MAC protocols for cognitive radio resources at operation 340. Generally speaking, beam search at operation 300, power control at operation 330 and MAC protocols at operation 340 may be only slightly modified (if at all) from conventional operations. Meanwhile, more significant adaptations and innovations are present in relation to beam detection and geospatial beam selection at operations 310 and 320, respectively, each of which will be described in greater detail below.

CASINO-NR must consider preventing interference with other neighboring waveforms in the 5G NR channel. The properties of orthogonal frequency-division multiplexing (OFDM) limit the range of cognitive radio use of the spectrum. The edge of orthogonality (EoO) is defined as a radius around a secondary cognitive radio node (e.g., node 192), where there is no inter-symbol interference (ISI) and inter-carrier interference (ICI) when operating within white space. The EoO is dependent on the cyclic prefix (CP), which acts as a guard time where the back portion of some symbol "x" is copied to the beginning of "x." The CP duration in 5G varies with subcarrier spacing and requires adaptation.

In CASINO-NR, which beams are available are subject to change as nodes move around to different small coverage areas. Hence, the smallest resource size is a single SSB. The SSB 290 only has four symbols which are too few time divisions to support contention with collision avoidance. CASINO-NR may adopt slotted aloha as a best fit MAC because of the small number of contention slots, short time transition interval, and the rigid OFDM structure. To adapt the throughput for slotted aloha, CASINO-NR may not need to consider the primary network load as seen by equation (1) below:

$$S_N = Ge^{-G} \times c_n \times \tau \times r, \quad (1)$$

where G is secondary traffic load, $c_n$ is node connectivity, $\tau$ is transmitter detection rate, and r is receiver detection rate (i.e., the chance that the transmitter and receiver secondary nodes detect the same available beams). The throughput is based on the number of available beams (Wi), the number of resource elements of each beam (E), the modulation scheme (M), and the coding rate (C) that make up the number of bits per packet (B=Wi×E×M×C) to convert to bits per second using equation (2):

$$S_N = S_N B. \quad (2)$$

The system assumptions for CASINO-NR may be as follows: 1) CASINO-NR employs out-of-network detectors and self-reliant protocols. Out-of-network techniques include synchronization, decoding of broadcast system information, and geospatial awareness of beamforming waveforms. 2) The initial beam search may be performed according to conventional methods, and it may be assumed that channel information from the primary beam can be used in the beam detector with little concern of incorrect channel estimation after proper thresholding. 3) CASINO-NR assumes some level of geospatial awareness that improves by optimizing beam detection and measurement to prevent interference. Pre-deployment mapping or post-deployment movement and evaluation provide this information but require optimal beam detection to be effective. Example embodiments strive to compensate for insufficient geospatial awareness but not the total lack thereof. 4) A cognitive radio device may be assumed to be capable of estimating its proximity to the base station or tower through either power measurements or GPS coordinates and may also use such an estimate to determine rough beam coverage sizes. 5) After beam detection and selection, CASINO-NR uses a MAC protocol for throughput estimation as a best-fit MAC protocol for NR's short TTI and the small number of time contention windows possible in an SSB.

Geospatial reuse of 5G NR SSBs requires novel geospatial interference protocols to prevent interference on neighboring beams. Referring again to FIG. 2, the first, second, third, seventh and eighth signal strength measurements 211, 221, 231, 271 and 281 associated with the first, second, third, seventh and eighth beams 110, 120, 130, 170 and 180, respectively, are not within the range of interference of the secondary network, and therefore have available SSBs for a small geographic area where power control can prevent interference to the beams farther away from the cognitive cluster (e.g., node cluster 190). However, the fourth, fifth and sixth signal strength measurements 241, 251 and 261, which are associated with the fourth, fifth and sixth beams 140, 150 and 160 of FIG. 1, are within the range of interference of the secondary network and therefore risk interference. Geospatial beam selection and interference control are therefore necessary for secondary use of the SSBs. However, the main challenges for beam selection and power control include how to update the EoO for 5G NR's subcarrier spacing variability and find cluster sizes, how to control the interference for a cluster under diverse geospatial beamforming, and how to determine beam selection and avoidance.

To avoid interference with primary users, CASINO-NR optimizes beam detection by comparing SINR estimation strategies, improving correlations with combined references, and comparing phase mitigation strategies. Some challenges for beam detection and optimization may include determining a ranking for SINR algorithms to use for measuring beams, and determining which reference signals to use for beam detection (e.g., PSS, SSS, DMRS, or MIB). Another potential challenge is to determine how to improve beam detection under phase error and noise. CASINO-NR addresses these challenges through geospatial beam selection and beam detection optimization, as described herein.

Figure 4:
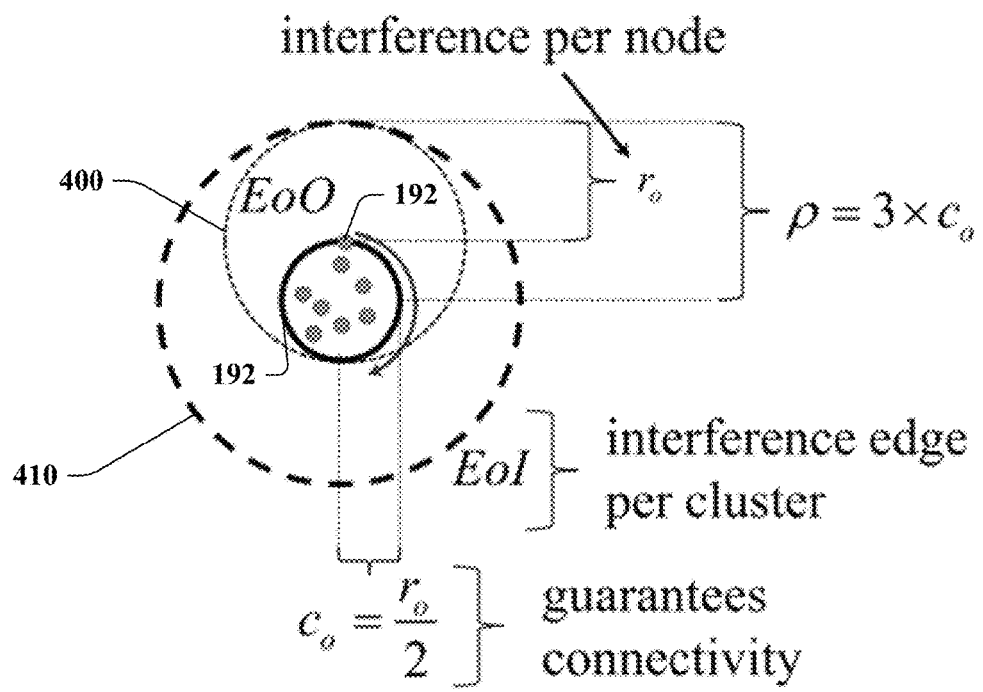
FIG. 4 illustrates cluster interference dimensions for orthogonal waveforms of an example embodiment.

Although somewhat out of the order of events shown in FIG. 3, we will address geospatial beam selections of operation 320 before focusing on beam detection of operation 310. In a typical situation, cognitive transmissions are only orthogonal at certain distances assuming a single beam. Additionally, ICI and ISI may occur on other beams where interference can occur on other neighboring beam waveforms if orthogonality is not preserved. The orthogonal range or EoO is defined by:

$$r_o = \frac{c(T_{CP} - \Delta\tau_{max})}{2} \quad (3)$$

which is impacted by the speed of light (c), the cyclic prefix length ($T_{CP}$), and the maximum excess delay spread ($\Delta\tau_{max}$). The overall effective range may come down to comparing the cyclic prefix and spreading delay. Though the interference and measured signal do not have overlapping subcarriers, they begin to interfere with one another at a maximum orthogonal path difference (OPD). The EoO is the OPD divided by two, which accounts for any user location by assuming the worst orientation and maximum delay between a cognitive radio transmitter and a synchronized base station. FIG. 4 illustrates these relationships where EoO 400 is shown relative node 192 among the node cluster 190. Edge of interference (EoI) 410 is also shown as effectively showing the interference edge for the node cluster 190.

In 5G NR, the EoO must consider the change in CP length found at configurable subcarrier spacing not found in 4G LTE. As the CP reduces, so do the excess delays expected in those scenarios. The typical expectation is that the maximum excess delay should scale with CP length to estimate the EoO ($r_o$) 400, cluster radius ($c_o$), and the radius for severe interference of a cluster ($\rho$) in FIG. 4. The reduction of the CP in higher subcarrier spacing, found typically at high frequencies, diminishes the range of orthogonal transmissions, yet it increases the chances of geospatial reuse of the spectrum when leveraging empty beamforming assignments around the base station. The EoO 400 considers a radius around a single node (e.g., node 192) where ICI and ISI are zero between the node 192 and the primary network. Communications can extend past the EoO 400, but are subject to interference. The radius for an orthogonal cluster of nodes is then half the size of the EoO 400 to guarantee every node in a cluster (e.g., node cluster 190) is orthogonal to each other as seen in FIG. 4. Other interference techniques that could increase the range such as cancellation carriers, guard intervals, and guard bands are outside the scope of this disclosure.

Figure 5:
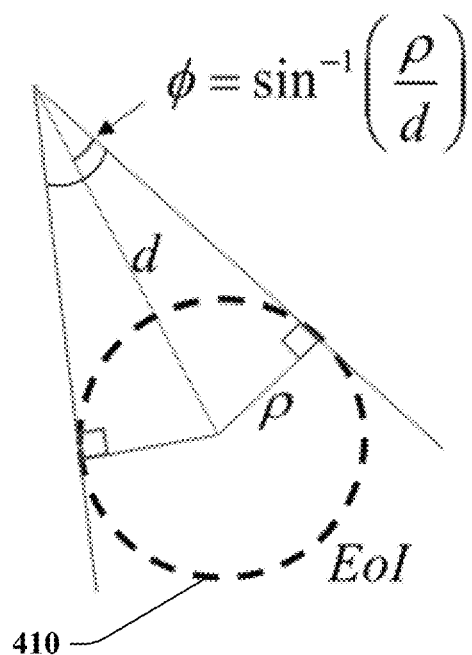
FIG. 5 illustrates geometry associated with cluster interference angle of effect in accordance with an example embodiment.

After geospatial beam selection of operation 320, CASINO-NR addresses power control for overlapping sectors or beams while considering the EoO 400 at operation 330. First, a distance may be selected to set power control for a cluster of nodes (e.g., node cluster 190) in FIG. 4 with the introduction of the edge of interference (EoI) 410. The EoI 410 or p is the radius from the cluster center where all nodes in the cluster begin to become non-orthogonal. At this radius, power control is not dependent on node distances, and a contention margin can be added to account for multiple interfering nodes. Within the EoI 410, some interference occurs past the cluster, defined with radius ($c_o$), but interference increases as secondary transmissions combine closer to the EoI 410. Outside the EoI 410, all nodes interfere, and the EoI 410 is the critical worst-case boundary to set power control that limits non-orthogonal interference. FIG. 5 shows how, based on the distance (d) and size of cluster interference (EoI 410), the angle at which a beam could perfectly cover a cluster can be calculated, where half this angle is φ. Determining this angle may assist in understanding how the EoI 410 overlaps with potential neighbor beams.

Figure 6:
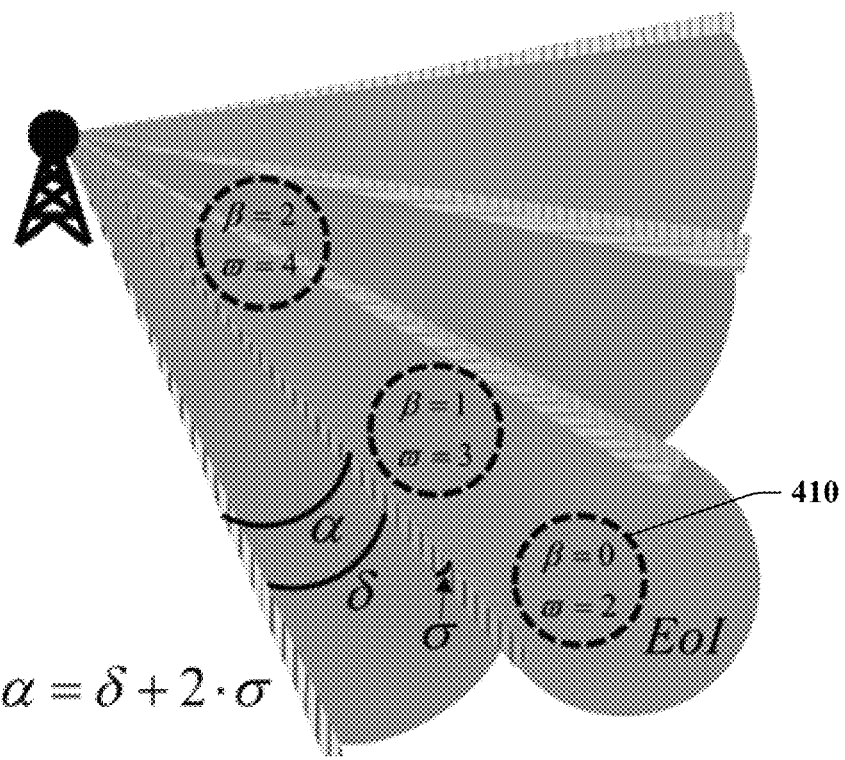
FIG. 6 illustrates beam overlap interference mitigation in accordance with an example embodiment.

To prevent interference, cognitive nodes must avoid beams that cross the EoI 410. Then power control will be performed at the EoI 410 to limit secondary interference to primary nodes. The number of neighbor beams within the secondary interference range comes from equation (4) below:

$$\beta = \sum_{z=1}^{Z}(z\cdot\delta + (n-1)2\cdot\sigma) < 2\cdot\phi \quad (4)$$

where CASINO-NR assumes knowledge of the number of Z beams deployed using the system information block type 1 (SIB1) broadcast message field ssb-PositionsInBurst, with beam angles of α, beam overlap of σ, and beam angle without overlap of δ, as seen in FIG. 6. At a high level, equation (4) compares between two times φ versus α and δ or how many beams overlap the EoI 410. These parameters can be approximated with post-analysis of an experimental beam deployment. Thereafter, cognitive nodes must determine how many beams should be avoided to prevent interference to neighboring primary nodes ($\varpi$). The worst-case scenario is being on the beam edge and the edge of multiple layers of beams; it is thus assumed the farther a node (e.g., node 192) is from the tower or base station, the higher the chance that such the node 192 will be in the next layer of beams. Thus, an approximate number of reflected beams (k) that should be avoided may be added as shown in equation (5) below:

$$\varpi = \left[\underset{primary}{1+}\ \underset{neighbor}{1+}\ \underset{overlap}{\beta}\right] \times \left(1 + \underset{layer}{d/R_L}\right) + \underset{reflections}{k} \quad (5)$$

where $R_L$ is the estimated size of the cell radius, and d is the distance to the cluster. Setting k reflected beams avoids beams from a non-direct line of sight. Next, the number of beams that pass threshold ν may be counted depending on the SINR estimation described below. Thus, the number of beams detected out of total beams (Z) is given by equation (6) below:

$$v = \sum_{z=1}^{Z} \text{SINR}(z) > v. \quad (6)$$

Cognitive nodes approximate the ratio of detected beams over the required number of beams using equation (7):

$$\Phi = v/\varpi \quad (7)$$

Determining the number of available beams for secondary communications (W) may be based on the total number of beams (N) minus the number of beams reserved ($\varpi$). Suppose the detection ratio is less than one. In that case, cognitive nodes can lower the chances of colliding with undetected beams by reducing the number of available beams through multiplication by the detection ratio as shown by equation (8):

$$W = \begin{cases} \text{if } (\Phi >= 1) & N - \varpi \\ \text{else} & (N - \varpi) \times \Phi \end{cases}. \quad (8)$$

This concept also decreases the number of beams available for secondary communications when too few beams are detected. It is assumed that the available beams are under some threshold to be considered white space for interweave cognitive radio. Such an assumption depends on the receiver sensitivity and other factors, but works by setting a threshold on the available beams with a maximum SINR threshold (w) as shown, for example in equation (9) below:

$$W_i = \sum_{n=1}^{W} \text{SINR}(n) < w. \quad (9)$$

Lowering $\alpha$ and $\delta$ in equation (4) can help in preventing interference by ultimately choosing fewer beams for secondary communication and handling insufficient beam information. Additionally, increasing the value of k in equation (5) increases the number of beams that must be avoided and lowers the ratio of detected beams over required beams in equation (7). Low values of 0, especially values under one, indicate too few beams have been detected and can trigger cognitive radios to halt transmission using equation (8). In summary, CASINO-NR addresses the first set of challenges associated with geospatial beam selection by: 1) Defining the EoO and orthogonal cluster size based on the reduced CP guard time and expected delay spread with varying subcarrier spacing and expected multipath deployments. 2) Defining the EoI as a boundary to set interference control for a cluster of nodes and determining how many beams to avoid based on the overlap of the EoI with beam coverage. 3) Considering the number of possible beams detected to ensure a configurable number of beams are avoided. Detection and ranking via SINR measurement are important to determine what beams are available for geospatial reuse and are the focus of the next section, which deals in greater detail with the beam detection of operation 310.

Figures 7, 8:
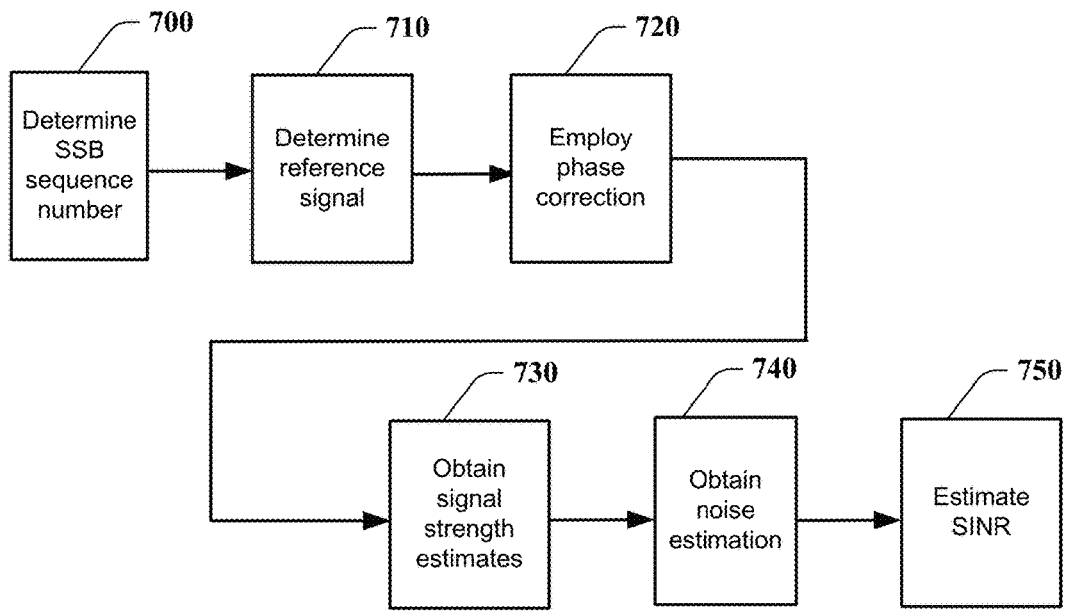
FIG. 7 illustrates a block diagram showing sup-operations associated with beam detection in accordance with an example embodiment.
FIG. 8 illustrates a table of parameters associated with a simulated test setup in accordance with an example embodiment.

After all parts of synchronization have met a collective group of thresholds ($\vartheta$) for each synchronization step, the beam detector can be optimized using combinations of reference signals, SINR estimation methods, and phase correction techniques, as shown in FIG. 7. To demonstrate an example, consider a channel with a known transmitted signal x, where H is the complex channel gain, n is Gaussian noise, and y is received signal seen in equation (10) below:

$$y = H \cdot (x) + (n) = H \cdot (\xi \cdot \psi) + (n \cdot r). \quad (10)$$

Signal and noise power must be scaled to ensure accurate measurements for RSRP, RSSI, and RSRQ. The signal and noise power for x and n are scaled by $\xi = \sqrt{\text{sinr}_w \cdot \text{noc}}$ and $\eta = \sqrt{\text{noc}/2 \cdot N_{FFT}}$ from non-scaled versions $\psi$ and r, respectively. Here $\text{sinr}_w$ is the linear SINR in watts, $N_{FFT}$ is the fast Fourier transform size for the NR waveform, and noc is the linear noise power spectral density that is set based on the 5G NR standard. The noc can also be approximated and scaled with live data if the noise variance is isolated without a signal or through the LS estimate, as discussed in the related work.

Next, the discussion shifts to how to optimize SINR and the related measurement statistics, where it is assumed that synchronization has been achieved to align to the SSB and that Y and X represent known sequences after demodulation in the frequency domain. The typical calculation of RSRP is done by finding the resource element power with only the received sequence using equation (11) below:

$$rsrp = \frac{1}{N} \sum_{i=0}^{N-1} Y \times Y^*, \quad (11)$$

where N is the number of resource elements in the sequence length. Measurement statistics like RSRP are capitalized to designate dB or dBm or lowercase like rsrp to designate linear scale. It may be possible to leverage the known information X with a correlation which is referred to as the reference signal receive correlation power (RSRC). RSRC gives element power using the cross-correlation of known and received signals by equation (12) below:

$$rsrc = \left| \frac{1}{N} \sum_{i=0}^{N-1} Y \times X^* \right|^2. \quad (12)$$

RSRC should produce more sensitive estimations because of the advantage of using a matched filter. Average symbol power or RSSI can be found using equation (13) below:

$$rssi = \frac{1}{S} \sum_{j=0}^{S-1} \left( \sum_{i=0}^{\Theta-1} |Q^2| \right), \quad (13)$$

where Q is the sequence of resource elements, $\Theta$ is the number of resource elements, and S is the number of symbols to average across. The RSRQ metric can use either rsrp or rsrc. In some examples, rsrq may be defined with rsrc, which using equation (14) below:

$$rsrq = \frac{rsrc \times N_{RB}}{rssi}. \quad (14)$$

After all measurement statistics have been described, it becomes possible to look at varying SINR methods designated with key letters such as "Q" for RSRQ, "L" for LS channel estimate, "P" for power, and "C" for correlation. In the Qmethod, RSRQ is related to SINR but depends on network load as seen by equation (15):

$$Q = \sin r = \frac{U}{\frac{1}{12 \times rsrq_c} - U}, \quad (15)$$

where network load (U) for an SSB is one as every carrier is populated. The LS estimate of channel H can be found by equation (16):

$$\hat{H} = \frac{Y}{X} = H + N, \quad (16)$$

where the channel estimation $\tilde{H}$ can be denoised by averaging using a smoothing window and interpolation $\tilde{H}_{AVG}$. The window size is to be optimized during simulation and testing. The noise and interference estimation can be found from their difference by equation (17):

$$\tilde{N} = \tilde{H} - \tilde{H}_{AVG}. \quad (17)$$

The L-Method uses the LS estimate for the signal component as shown by equation (18) below with:

$$L = \sin r = \frac{\tilde{H}}{\tilde{N}}. \quad (18)$$

The P-Method uses noise estimate from the LS estimate and rsrp from above as shown in equation (19) with:

$$P = \sin r = \frac{rsrp}{\tilde{N}}. \quad (19)$$

The C-Method uses noise from the LS estimate and the rsrc, specified above, using:

$$C = \sin r = \frac{rsrc}{\tilde{N}}, \quad (20)$$

This provides four ways to measure SINR with the Q, L, P, and C methods. However, the C-method may be preferred in some cases.

Each of the methods described above (i.e., the Q, L, P, and C methods) can use different combinations of reference signals for varying performance. In some cases, use of the PSS, SSS, and DMRS in beam measurement may be compared with combinations of sequences. Additionally, the MIB found in the primary beam may be re-encoded and added to a known reference to find neighbor beams from the same sector for additional gain. Lastly, three methods of phase correction may be used with the Q and C-methods to account for phase noise and error, namely subset, differential, and equalization, which is recommended for the C-method. Each phase mitigation corrects the signal power under interference, but negatively affects the sensitivity of the SINR estimate. Optimizing these SINR algorithms may be very helpful in relation to avoiding neighboring beams and determining geospatial SSB reuse.

FIG. 7 illustrates a block diagram of various sub-operations that may be included within beam detection of operation 310 of FIG. 3. In this regard, the beam detection may follow beam search activities (of operation 300), which may include convention beam and/or cell search operations involving integer carrier frequency offset (IFO), fractional frequency offset (FFO), physical-layer cell identity (PCID) detection for SSS, identifying the beam index, channel equalization activities, master information gathering, control channel, and system information related operations. Beam detection may initially involve SSB sequence number determination based on a bitmap at operation 700. Thereafter, at operation 710, a reference signal may be determined. The reference signal determination may include any one of DMRS, SSS, PSS, MIB, etc. Moreover, using combinations of multiple reference signals may be advantageous in some cases in order to increase sensitivity. Thereafter, at operation 720, phase correction may be employed. Phase correction may include the differential method, the subset method or the equalization method. In an example embodiment, the equalization method may be used in connection with combining reference signals for improved performance.

At operation 730, signal estimates may be obtained using H estimates, RSRP, or RSRC, for example. Noise estimation may then be accomplished at operation 740 using, for example, LS estimates, or RSSI. Finally, at operation 750, SINR may be estimated via any of the Q, L, P or C-methods. In some embodiments, superior performance may be achieved by combining RSRC, LS estimates and the C-method for signal estimation, noise estimation and SINR estimation when coupled with equalization for phase correction along with a combination of reference signals.

In summary, CASINO-NR addresses the design challenges discussed above by: 1) Introducing the C-method for SINR estimation and beam measurements. 2) Leveraging all possible references in the SSB, including the PSS, SSS, DMRS, and MIB, and combining multiple of these reference signals to provide higher gain and detection capabilities. 3) Improving beam detection by comparing the differential, subset, and recommended equalization phase mitigation techniques.

CASINO-NR, as described herein, has been validated through simulation using MATLAB® 2020b, where a cell and a beam detector are implemented. The implementation also has modeled interference caused by CASINO-NR to evaluate the impact of beam selection and power control. Simulations ran over 1000 times with the parameters for path loss, channel, and interference modeling, produced results table 800 using parameters shown in FIG. 8, which mimic the suburban scenario found in the experimental results. The simulation steps used to generate the results shown in FIG. 8 included toolbox selection, waveform creation, channel effects, SINR setting, and the selection of algorithms and statistics for beam detection and interference modeling.

Figure 9:
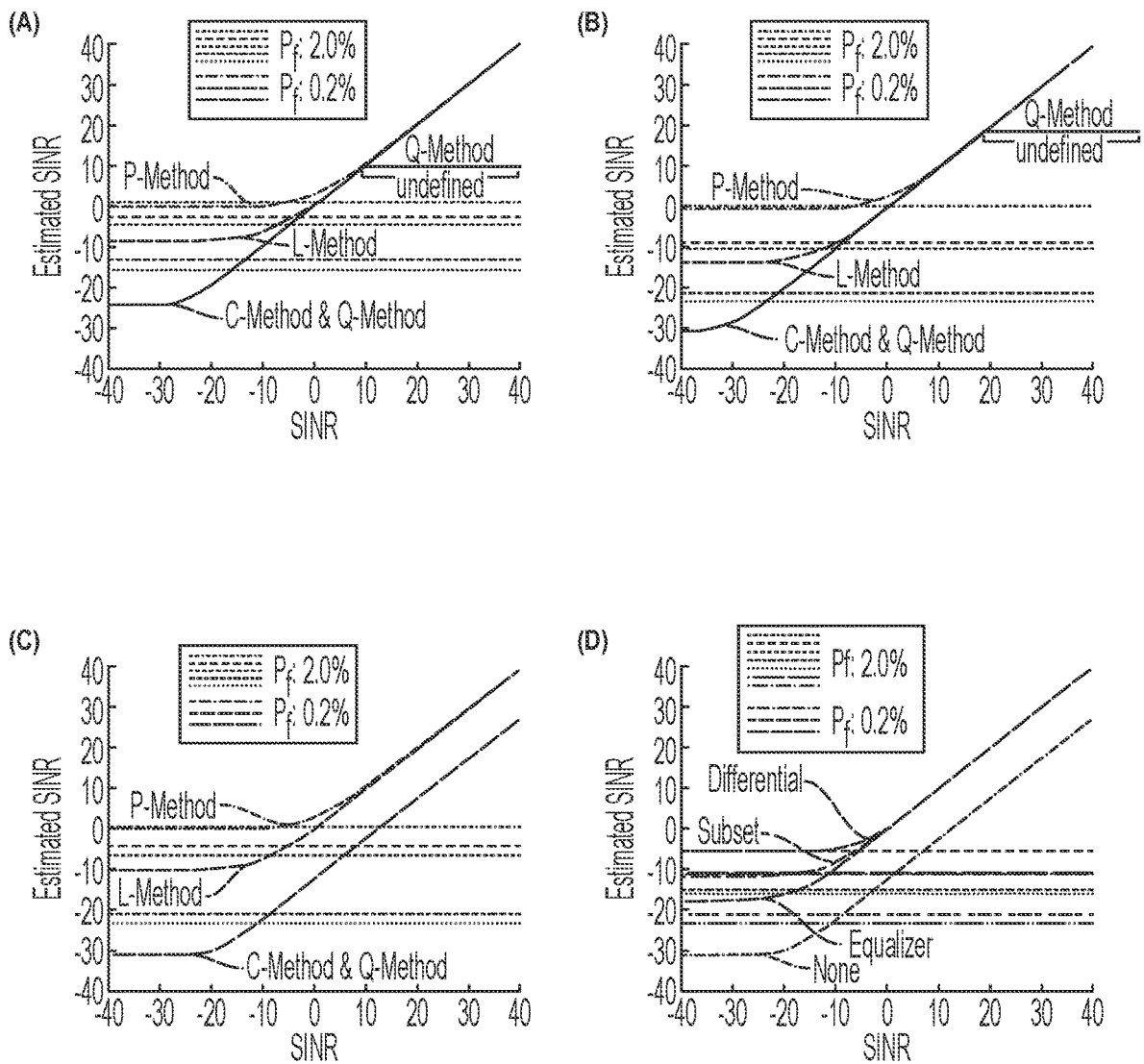
FIG. 9 illustrates four plots of simulated sensitivity for four different SINR algorithms in accordance with an example embodiment.

As noted above, beam detection contributes heavily to the performance of CASINO-NR and has also been validated through simulation. FIG. 9 shows various results of the SINR estimations under different noise levels in four separate plots labeled plot (A), plot (B), plot (C), and plot (D). Methods P, L, Q, and C are shown in Plot (A) of FIG. 9, with thresholds of the probability of false alarm of 2.0% and 0.2% found using the Monte Carlo method. Plot (A) uses only the DMRS as the reference signal, whereas plot (B) shows the improvement when using the PSS, SSS, DMRS, and re-encoded MIB. Going from DMRS to all possible reference signals of the SSB shows a 1, 5, and 8 dB improvement in sensitivity for the P, L, and C-method, respectively. The sensitivity improvement demonstrates the value of combining reference signals for increased sensitivity.

The Q and C-method both produce almost the same sensitivity curves because they both leverage rsrc and, under phase distortions in plot (C), deteriorate in performance using the same SSB reference signals as plot (B). The performance decrease for adding phase error is roughly 0 and 5 dB for the P and L-methods, whereas the C-method accrues 43% error in all SINR estimations. A fading channel with only phase errors may be applied to keep the tested SINR constant while seeing the effect of phase interference using a tapped delay line (TDL).

Additionally, at higher SINRs, the Q-method becomes undefined, as seen in plot (A) and plot (B), because the SINR is dominated by path loss. Accordingly, only the C-method is plotted for phase mitigation in plot (D). In plot (D), the phase mitigation corrects the correlation results to properly estimate the SINR with sensitivities of −6, −12, and −16 dB for the subset, differential, and equalization methods, respectively. The equalization method elevates the C-method as the most attractive approach under noise and phase interference compared to the P, L, and Q-methods. Other simulation results associated with multiple combinations of reference signals, SINR methods, and phase mitigation techniques further demonstrate increased sensitivity for the C-method relative to other methods, and for the equalization approach relative to the subset and differential approaches.

To better understand the types of interference experienced by CASINO-NR, interference may be modeled using the settings of results table 800 in FIG. 8, or other parameters. Some simulations explored used a base station signal with 60 PRBs and a 20 PRB notch for SSB insertion, and demonstrated the results noted above. Geospatially reusing the SSB in neighboring beams requires optimized detection and ranking to find and eliminate beams subject to cognitive interference that could diminish primary user communications. Example embodiments may therefore provide CASINO-NR as a practical approach for self-reliant cognitive radio in 5G NR. CASINO-NR may avoid the challenges of 5G's increased complexity by leveraging geospatial SSBs as a new resource for secondary networks. The effectiveness of the CASINO-NR approach has been demonstrated with simulations and experiments, the results of which have validated that CASINO-NR optimized beam detection and reuse. Optimization via the C-method for SINR detection under interference by using the equalize phase correction approach may, in some cases, provide an additional 6 and 11 dB over the subset and differential methods. Using the C-method may also gain an additional 8 and 16 dB over the L-method and P-method, respectively. The Q-method was found to have similar performance when using a correlation as the C-method, but can have discontinuities. Lastly, using all known references, including the re-encoded MIB, gives an additional 4 to 5 dB improvement over using the SS and SS with DRMS. The beam detector may operate, in some cases, down to −17 and −15 dB in simulation and experiment, respectively.

Using optimized beam detection, adapted power control protocols may assist in avoiding critical primary beams. An overlay cancellation method may, in some cases, be used instead of interweave to use beams that are higher power, but still far enough away from cognitive nodes. Cancellation carriers or guard bands could increase cognitive transmission range by trading off throughput. Self-reliant communication channels may be considered a useful addition to the overall cellular capabilities rather than a complete solution. For that, adaptations of network layer solutions to dynamically include self-reliant cognitive backup links may be employed.

Figure 10:
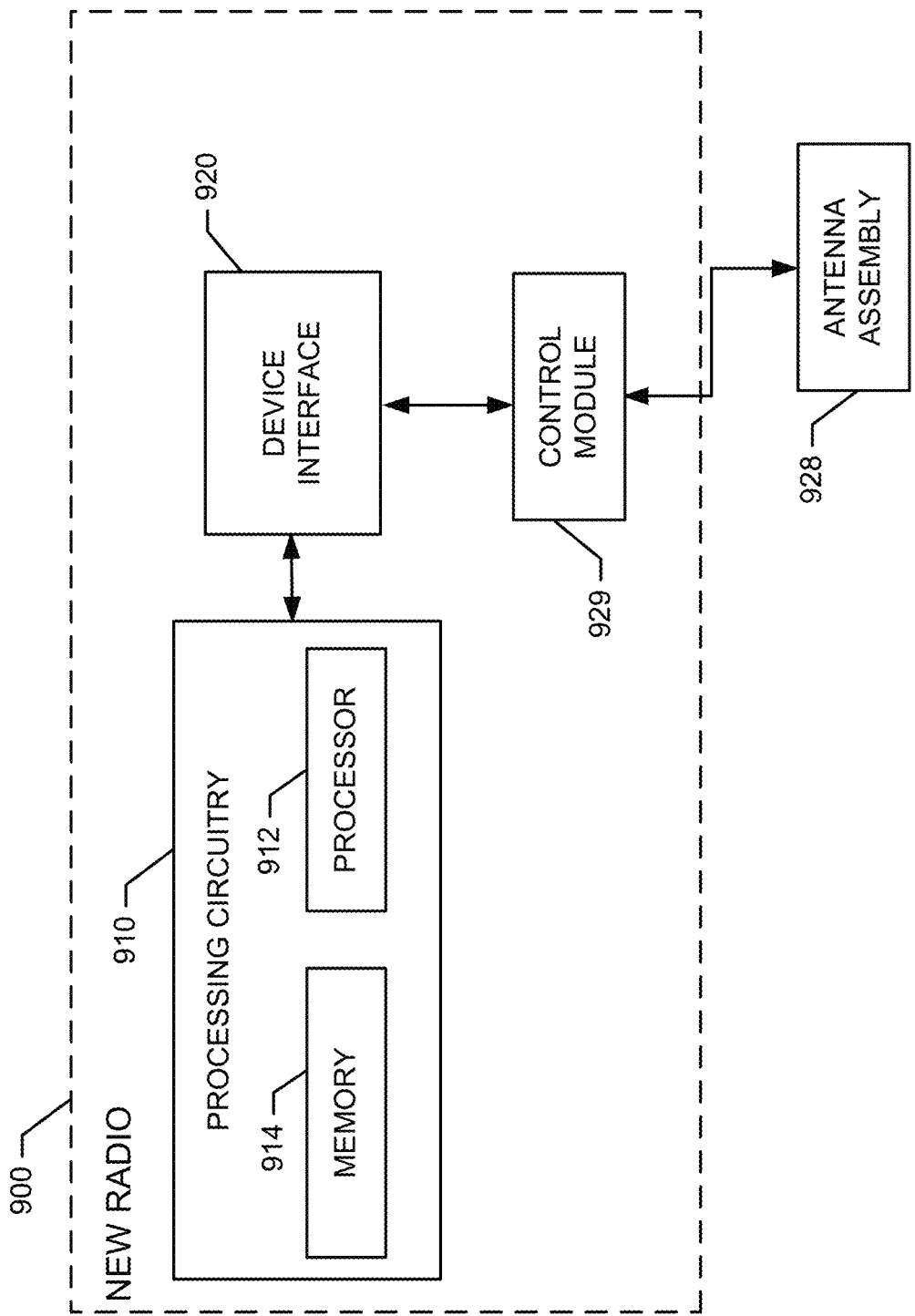
FIG. 10 illustrates a block diagram of various components that may be employed in connection with defining the secondary network in accordance with an example embodiment.

FIG. 10 illustrates an example structure for a self-reliant, new radio 900 of an example embodiment. In this regard, as shown in FIG. 10, the new radio 900 may include processing circuitry 910 configured to perform data processing, control function execution and/or other processing and management services according to an example embodiment. In some embodiments, the processing circuitry 910 may be embodied as a chip or chip set. In other words, the processing circuitry 910 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 910 may therefore, in some cases, be configured to implement an embodiment on a single chip or as a single "system on a chip." As such, in some cases, a chip or chipset may constitute means for performing one or more operations for providing the functionalities described herein.

In an example embodiment, the processing circuitry 910 may include one or more instances of a processor 912 and memory 914 that may be in communication with or otherwise control a device interface 920. As such, the processing circuitry 910 may be embodied as a circuit chip (e.g., an integrated circuit chip) configured (e.g., with hardware, software or a combination of hardware and software) to perform operations described herein. However, in some embodiments, the processing circuitry 910 may be embodied as a portion of an on-board computer. In some embodiments, the processing circuitry 910 may communicate with various components, entities, systems and/or sensors of the new radio 900, e.g., via the device interface 920. Thus, for example, the processing circuitry 910 may communicate with an antenna assembly 928 and corresponding control module 929 to control the frequency and/or direction at which the antenna assembly 928 is configured to operate.

The device interface 920 may include one or more interface mechanisms for enabling communication with other devices (e.g., modules, entities, sensors and/or other components of the new radio 900). In some cases, the device interface 920 may be any means such as a device or circuitry embodied in either hardware, or a combination of hardware and software that is configured to receive and/or transmit data from/to modules, entities, sensors and/or other components of the new radio 900 that are in communication with the processing circuitry 910. In this regard, for example, the device interface 920 may be configured to operably couple the processing circuitry 910 to antenna assembly 928 and/or the control module 929.

The processor 912 may be embodied in a number of different ways. For example, the processor 912 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 912 may be configured to execute instructions stored in the memory 914 or otherwise accessible to the processor 912. As such, whether configured by hardware or by a combination of hardware and software, the processor 912 may represent an entity (e.g., physically embodied in circuitry—in the form of processing circuitry 910) capable of performing operations according to embodiments while configured accordingly. Thus, for example, when the processor 912 is embodied as an ASIC, FPGA or the like, the processor 912 may be specifically configured hardware for conducting the operations described herein. Alternatively, as another example, when the processor 912 is embodied as an executor of software instructions, the instructions may specifically configure the processor 912 to perform the operations described herein.

In an example embodiment, the processor 912 (or the processing circuitry 910) may be embodied as, include or otherwise control the operation of the control module 929 based on inputs received by the processing circuitry 910. As such, in some embodiments, the processor 912 (or the processing circuitry 910) may be said to cause each of the operations described in connection with the control module 929. The processor 912 may also control the antenna assembly 928 to tune the antenna assembly 928 to perform the high level operations of FIG. 3, and the sub-operations associated with each of the operations shown in FIG. 3 in relation to adjustments to be made to antenna assembly 928 or other components of the new radio 900 to undertake the corresponding functionalities relating to array configuration in a self-reliant network using primary network resources selected based on execution of instructions or algorithms configuring the processor 912 (or processing circuitry 910) accordingly.

In an exemplary embodiment, the memory 914 may include one or more non-transitory memory devices such as, for example, volatile and/or non-volatile memory that may be either fixed or removable. The memory 914 may be configured to store information, data, applications, instructions or the like for enabling the processing circuitry 910 to carry out various functions in accordance with exemplary embodiments. For example, the memory 914 could be configured to buffer input data for processing by the processor 912. Additionally or alternatively, the memory 914 could be configured to store instructions for execution by the processor 912. As yet another alternative, the memory 914 may include one or more databases that may store a variety of data sets responsive to input sensors and components. Among the contents of the memory 914, applications and/or instructions may be stored for execution by the processor 912 in order to carry out the functionality associated with each respective application/instruction. In some cases, the applications may include instructions for providing inputs to control operation of the antenna assembly 928 and/or the control module 929 as described herein.

Figure 11:
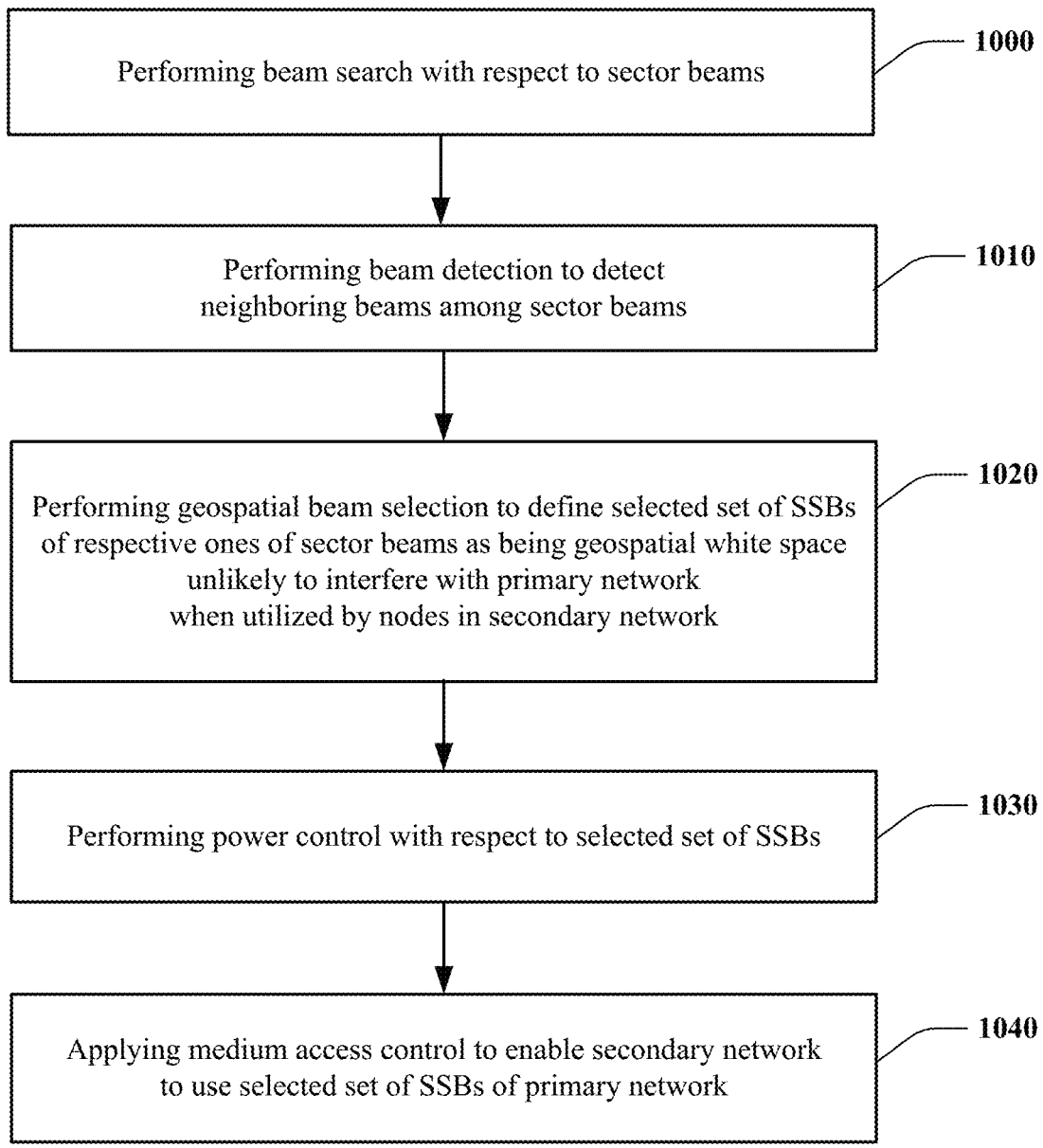
FIG. 11 illustrates a functional block diagram of a method according to an example embodiment.

FIG. 11 illustrates a block diagram of one method that may be associated with an example embodiment as described above. From a technical perspective, the processing circuitry 910 described above may be used to support some or all of the operations described in FIG. 11. As such, the platform described in FIG. 10 may be used to facilitate the implementation of several computer program and/or network communication-based interactions. As an example, FIG. 11 is a flowchart of a method and program product according to an example embodiment. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a device (e.g., the processing circuitry 910, and/or the like) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture that implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method for providing a self-reliant secondary network of communication nodes using resources associated with a primary network defining multiple sector beams using corresponding resources including respective SSBs may be provided, as shown in FIG. 11. The method may include performing a beam search with respect to the sector beams at operation 1000, performing beam detection to detect neighboring beams among the sector beams at operation 1010. The detection of neighboring beams may include detection of the local beams or strongest beams that are most likely to interfere with the secondary network. The method may further include performing geospatial beam selection to define a selected set of SSBs of respective ones of the sector beams as being geospatial white space unlikely to interfere with the primary network when utilized by the nodes in the secondary network at operation 1020. The method may further include performing power control with respect to the selected set of SSBs at operation 1030. The power control management that is applied may allow coexistence of the secondary network and the primary network. The method may also include applying medium access control protocols to enable the secondary network to use the selected set of SSBs of the primary network at operation 1040.

Thus, in accordance with an example embodiment, a new radio system for providing wireless communication to nodes of a self-reliant node cluster using resources of a primary network may be provided. The new radio system may include a primary network base station defining multiple sector beams using corresponding resources including respective SSBs, and a plurality of nodes defining a node cluster in which the nodes of the node cluster each include a control module associated with processing circuitry. The processing circuitry may be configured to perform a beam search with respect to the sector beams, perform beam detection to detect parameters associated with the sector beams, perform geospatial beam selection to define a selected set of SSBs of respective ones of the sector beams as being in geospatial white space unlikely to interfere with the primary network when utilized by the nodes in the secondary network, perform power control with respect to the selected set of SSBs, and apply medium access control protocols for coexistence of the secondary network and the primary network.

In some embodiments, the system may include additional, optional features, and/or the features described above may be modified or augmented. Some examples of modifications, optional features and augmentations are described below. It should be appreciated that the modifications, optional features and augmentations may each be added alone, or they may be added cumulatively in any desirable combination. In an example embodiment, performing beam detection may include determining an SSB sequence number for detected ones of the sector beams (e.g., determining all possible SSB sequence numbers that should be monitored), determining a reference signal for the detected ones of the sector beams, employing a selected phase correction for the detected ones of the sector beams, obtaining signal strength estimates for the detected ones of the sector beams, estimating noise or interference for the detected ones of the sector beams, and estimating a signal to interference and noise ratio (SINR) for the detected ones of the sector beams. In some cases, determining the reference signal may include employing multiple combined reference signals. In an example embodiment, the multiple combined reference signals may include at least two from a group including PSS, SSS, DMRS, and MIB. In some cases, employing the selected phase correction may include employing a differential phase correction, a subset phase correction, or a channel equalization phase correction. In an example embodiment, obtaining signal strength estimates may include employing an H estimate, RSRP, or RSRC. In some cases, estimating noise or interference may include employing an LS estimate or RSSI to determine the noise or interference. In an example embodiment, estimating SINR may include employing a Q-method, an L-method, a P-method or a C-method to estimate SINR. In an example embodiment, performing geospatial beam selection may include ranking the detected ones of the sector beams based on the parameters detected during beam detection, and applying a threshold to the ranked beams. In this context, the selected set of SSBs may correspond to the ranked beams that exceed the threshold. In other words, the selected set of SSBs may correspond to lower ranked beams that pass detection and white-space thresholds.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A radio system for providing a self-reliant secondary network using resources associated with a primary network, the radio system comprising:
   a primary network base station defining sector beams using corresponding resources including respective synchronization signal blocks (SSBs); and
   a plurality of nodes defining a node cluster, the nodes of the node cluster each comprising a control module associated with processing circuitry configured to:
   perform a beam search with respect to the sector beams;
   perform beam detection to detect neighboring beams among the sector beams;
   perform geospatial beam selection to define a selected set of SSBs of respective ones of the sector beams as being geospatial white space unlikely to interfere with the primary network when utilized by the nodes in the secondary network;
   perform power control with respect to the selected set of SSBs; and
   apply medium access control protocols to enable the secondary network to use the selected set of SSBs of the primary network.

2. The radio system of claim 1, wherein performing beam detection comprises:
   determining an SSB sequence number for detected ones of the sector beams;
   determining a reference signal for the detected ones of the sector beams;
   employing a selected phase correction for the detected ones of the sector beams;
   obtaining signal strength estimates for the detected ones of the sector beams;
   estimating noise or interference for the detected ones of the sector beams; and
   estimating a signal to interference and noise ratio (SINK) for the detected ones of the sector beams.

3. The radio system of claim 2, wherein determining the reference signal comprises employing multiple combined reference signals.

4. The radio system of claim 3, wherein the multiple combined reference signals include at least two from a group comprising:
   primary synchronization signal (PSS);
   secondary synchronization signal (SSS);
   demodulated reference signals (DMRS); and
   a master information block (MIB).

5. The radio system of claim 2, wherein employing the selected phase correction comprises employing:
   a differential phase correction,
   a subset phase correction, or
   a channel equalization phase correction.

6. The radio system of claim 2, wherein obtaining signal strength estimates comprises employing an H estimate, reference signals received power (RSRP), or reference signal receive correlation (RSRC) to obtain the signal strength estimates.

7. The radio system of claim 2, wherein estimating noise or interference comprises employing an LS estimate or received signal strength indicator (RSSI) to determine the noise or interference.

8. The radio system of claim 2, wherein estimating SINR comprises employing a Q-method, an L-method, a P-method, or a C-method to estimate SINR.

9. The radio system of claim 1, wherein performing geospatial beam selection comprises ranking detected ones of the sector beams based on parameters detected during beam detection, and applying a threshold to the ranked beams.

10. The radio system of claim 9, wherein the selected set of SSBs correspond to the ranked beams that exceed the threshold.

11. A method for providing a self-reliant secondary network of communication nodes using resources associated with a primary network defining sector beams using corresponding resources including respective synchronization signal blocks (SSBs), the method comprising:
- performing a beam search with respect to the sector beams;
- performing beam detection to detect neighboring beams among the sector beams;
- performing geospatial beam selection to define a selected set of SSBs of respective ones of the sector beams as being geospatial white space unlikely to interfere with the primary network when utilized by the communication nodes in the secondary network;
- performing power control with respect to the selected set of SSBs; and
- applying medium access control protocols to enable the secondary network to use the selected set of SSBs of the primary network.

12. The method of claim 11, wherein performing beam detection comprises:
- determining an SSB sequence number for detected ones of the sector beams;
- determining a reference signal for the detected ones of the sector beams;
- employing a selected phase correction for the detected ones of the sector beams;
- obtaining signal strength estimates for the detected ones of the sector beams;
- estimating noise or interference for the detected ones of the sector beams; and
- estimating a signal to interference and noise ratio (SINK) for the detected ones of the sector beams.

13. The method of claim 12, wherein determining the reference signal comprises employing multiple combined reference signals.

14. The method of claim 13, wherein the multiple combined reference signals include at least two from a group comprising:
- primary synchronization signal (PSS);
- secondary synchronization signal (SSS);
- demodulated reference signals (DMRS); and
- a master information block (MIB).

15. The method of claim 12, wherein employing the selected phase correction comprises employing:
- a differential phase correction,
- a subset phase correction, or
- a channel equalization phase correction.

16. The method of claim 12, wherein obtaining signal strength estimates comprises employing an H estimate, reference signals received power (RSRP), or reference signal receive correlation (RSRC) to obtain the signal strength estimates.

17. The method of claim 12, wherein estimating noise or interference comprises employing an LS estimate or received signal strength indicator (RSSI) to determine the noise or interference.

18. The method of claim 12, wherein estimating SINR comprises employing a Q-method, an L-method, a P-method or a C-method to estimate SINR.

19. The method of claim 11, wherein performing geospatial beam selection comprises ranking detected ones of the sector beams based on parameters detected during beam detection, and applying a threshold to the ranked beams.

20. The method of claim 19, wherein the selected set of SSBs correspond to the ranked beams that exceed the threshold.

* * * * *